(12) United States Patent
Lee et al.

(10) Patent No.: US 8,194,579 B2
(45) Date of Patent: Jun. 5, 2012

(54) METHOD OF TRANSMITTING AND RECEIVING POINT-TO-MULTIPOINT SERVICE IN MOBILE COMMUNICATION SYSTEM

(75) Inventors: Young Dae Lee, Gyeonggi-do (KR); Sung Duck Chun, Gyeonggi-do (KR); Myung Cheul Jung, Seoul (KR); Patrick Fischer, La rein (FR)

(73) Assignee: LG Electronics Inc., Seoul (KR)

( * ) Notice: Subject to any disclaimer, the term of this patent is extended or adjusted under 35 U.S.C. 154(b) by 264 days.

(21) Appl. No.: 11/913,543

(22) PCT Filed: Apr. 27, 2006

(86) PCT No.: PCT/KR2006/001587
§ 371 (c)(1),
(2), (4) Date: Jul. 25, 2008

(87) PCT Pub. No.: WO2006/118393
PCT Pub. Date: Nov. 9, 2006

(65) Prior Publication Data
US 2009/0116418 A1 May 7, 2009

(30) Foreign Application Priority Data

May 4, 2005 (KR) .................. 10-2005-0037714

(51) Int. Cl.
*H04H 20/71* (2008.01)
(52) U.S. Cl. ................. 370/312; 370/318; 370/328
(58) Field of Classification Search .......... 370/312, 370/318, 328, 335
See application file for complete search history.

(56) References Cited

U.S. PATENT DOCUMENTS

| 6,729,929 B1 * | 5/2004 | Sayers et al. | 455/446 |
| 7,747,275 B2 * | 6/2010 | Funnell et al. | 455/525 |

(Continued)

FOREIGN PATENT DOCUMENTS

EP          1 475 973 A1    11/2004

(Continued)

OTHER PUBLICATIONS

Nokia, et al., "Introduction of MSCH and Soft Combining and Other General Corrections," Change Request 25.436 CR 007 Revision 1 V6.2.0, 3GPP TSG-RAN WG2 Meeting #45, Nov. 15, 2004, XP050127211.

*Primary Examiner* — Ricky Ngo
*Assistant Examiner* — Rasheed Gidado
(74) *Attorney, Agent, or Firm* — Lee, Hong, Degerman, Kang & Waimey

(57) ABSTRACT

A method of transmitting a point-to-multipoint service in a mobile communication system, method of receiving the same, apparatus for transmitting the same and apparatus receiving the same are disclosed, by which a transmission parameter of a channel providing a point-to-multipoint service to a plurality of cells can be informed to UEs receiving the point-to-multipoint service. The present invention includes receiving at least one transmission parameter on a point-to-multipoint signaling channel providing scheduling information of the point-to-multipoint service wherein the point-to-multipoint signaling channel is mapped to the point-to-multipoint channel, combining the point-to-multipoint channel transmitted from a plurality of cells by using the at least one transmission parameter, and receiving the point-to-multipoint service on a point-to-multipoint traffic channel wherein the point-to-multipoint traffic channel is mapped to the point-to-multipoint channel.

3 Claims, 9 Drawing Sheets

U.S. PATENT DOCUMENTS

| | | | |
|---|---|---|---|
| 2002/0077141 A1* | 6/2002 | Hwang et al. | 455/522 |
| 2003/0100325 A1* | 5/2003 | Paila et al. | 455/506 |
| 2003/0207696 A1* | 11/2003 | Willenegger et al. | 455/522 |
| 2004/0022218 A1* | 2/2004 | Kim et al. | 370/335 |
| 2004/0081125 A1* | 4/2004 | Ranta-Aho et al. | 370/335 |
| 2004/0223513 A1* | 11/2004 | Meago | 370/468 |
| 2004/0229624 A1* | 11/2004 | Cai et al. | 455/449 |
| 2005/0041681 A1 | 2/2005 | Lee et al. | |
| 2005/0043050 A1 | 2/2005 | Lee et al. | |
| 2005/0068963 A1* | 3/2005 | Lee et al. | 370/395.3 |
| 2005/0124349 A1* | 6/2005 | Lin et al. | 455/450 |
| 2006/0068793 A1* | 3/2006 | Van Lieshout et al. | 455/444 |
| 2006/0234755 A1* | 10/2006 | Jonsson et al. | 455/525 |
| 2007/0211720 A1* | 9/2007 | Fuchs et al. | 370/390 |
| 2008/0305790 A1* | 12/2008 | Wakabayashi | 455/434 |

FOREIGN PATENT DOCUMENTS

| | | |
|---|---|---|
| EP | 1643786 | 4/2006 |

* cited by examiner

METHOD OF TRANSMITTING AND RECEIVING POINT-TO-MULTIPOINT SERVICE IN MOBILE COMMUNICATION SYSTEM

CROSS-REFERENCE TO RELATED APPLICATIONS

Pursuant to 35 U.S.C. §119, this application claims the benefit of earlier filing date and right of priority to International Application No. PCT/KR2006/001587, filed on Apr. 27, 2006, and to Korean Application No. 10-2005-0037714, filed on May 4, 2005.

TECHNICAL FIELD

The present invention relates to a wireless mobile communication system, and more particularly, to a method of transmitting a point-to-multipoint service in a mobile communication system, method of receiving the same, apparatus for transmitting the same and apparatus receiving the same.

BACKGROUND ART

FIG. 1 is a block diagram of a network structure of UMTS (universal mobile telecommunications system) of 3GPP asynchronous IMT-2000 system.

Referring to FIG. 1, a universal mobile telecommunications system (hereinafter abbreviated UMTS) mainly includes a user equipment (hereinafter abbreviated UE), a UMTS terrestrial radio access network (hereinafter abbreviated UTRAN) and a core network (hereinafter abbreviated CN).

The UTRAN includes at least one radio network sub-system (hereinafter abbreviated RNS). And, the RNS includes one radio network controller (hereinafter abbreviated RNC) and at least one base station (hereinafter called Node B) managed by the RNC. And, at least one or more cells exist in one Node B.

FIG. 2 is an architectural diagram of a radio interface protocol between UE (user equipment) and UTRAN (UMTS terrestrial radio access network) based on 3GPP radio access network specifications.

Referring to FIG. 2, a radio interface protocol vertically includes a physical layer, a data link layer, and a network layer and horizontally includes a user plane for data information transfer and a control plane for signaling transfer.

The protocol layers in FIG. 2 can be classified into L1 (first layer), L2 (second layer), and L3 (third layer) based on three lower layers of the open system interconnection (OSI) standard model widely known in the communications systems.

The respective layers in FIG. 2 are explained as follows.

First of all, the physical layer (hereinafter named PHY) as the first layer offers an information transfer service to an upper layer using a physical channel. The physical layer PHY is connected to a medium access control (hereinafter abbreviated MAC) layer above the physical layer PHY via a transport channel. And, data are transferred between the medium access control layer MAC and the physical layer PHY via the transport channel. Moreover, data are transferred between different physical layers, and more particularly, between one physical layer of a transmitting side and the other physical layer of a receiving side via the physical channel.

The medium access control (hereinafter abbreviated MAC) layer of the second layer offers a service to a radio link control layer above the MAC layer via a logical channel. The radio link control (hereinafter abbreviated RLC) layer of the second layer supports reliable data transfer and is operative in segmentation and concatenation of RLC service data units sent down from an upper layer. Hereinafter, the service data unit will be abbreviated SDU.

A broadcast/multicast control (hereinafter abbreviated 'BMC') layer schedules a cell broadcast message (hereinafter abbreviated 'CB message') delivered from a core network and plays a role in broadcasting the message to UEs existing in a specific cell(s). In aspect of UTRAN, a CB message delivered from a higher layer is additionally provided with information such as a message ID, a serial number, a coding scheme and the like, is delivered to an RLC layer in a format of BMC message, and is then delivered to a MAC layer via a logical channel CTCH (common traffic channel). And, the logical channel CTCH is mapped to a transport channel FACH (forward access channel) and a physical channel S-CCPCH (secondary common control physical channel).

A packet data convergence protocol (hereinafter abbreviated PDCP) layer lies above the RLC layer and enables data, which is transferred via such a network protocol as IPv4 or IPv6, to be efficiently transferred on a radio interface having a relatively small bandwidth. For this, the PDCP layer plays a role in reducing unnecessary control information used by a wire network. This function is called header compression, for which header compression scheme of RFC2507 or RFC3095 (robust header compression: ROHC) defined by IETF (Internet Engineering Task Force) can be used. In these schemes, information mandatory for a header part of data is transferred only to reduce data volume to be transferred in a manner of transferring smaller control information.

A radio resource control (hereinafter abbreviated 'RRC') layer located on a lowest part of the third layer is defined in the control plane only and is associated with configuration, reconfiguration and release of radio bearers to be in charge of controlling the logical, transport and physical channels (hereinafter, the radio bearer will be abbreviated RB). In this case, the RB means a service offered to the second layer for the data transfer between the UE and the UTRAN. And, the configuration of RB means a process of regulating characteristics of protocol layers and channels necessary for offering a specific service and a process of setting their specific parameters and operational methods, respectively.

The RRC layer plays a role in broadcasting system information on BCCH (broadcast control channel). System information for one cell is broadcast to UE in formats of several system information blocks. Hereinafter, the system information block is abbreviated 'SIB'. In case that system information is modified, UTRAN transmits BCCH modification information on PCH (paging channel) or FACH (forward access channel) to UE. Hence, the UE is enabled to receive latest system information.

A multimedia broadcast/multicast service (hereinafter abbreviated 'MBMS') is explained in detail as follows.

First of all, an MBMS offers a streaming or background service to a plurality of UEs using a downlink dedicated MBMS bearer service. One MBMS includes at least one session, and MBMS data are transmitted to a plurality of the UEs via the MBMS bearer service during an ongoing session only. UE performs an activation job to receive a subscribed service and receives a service activated by the UE only.

UTRAN offers an MBMS bearer service to a UE using a radio bearer. As a type of the radio bearer (RB) used by the UTRAN, there is a point-to-point radio bearer or a point-to-multipoint radio bearer. In this case, the point-to-point radio bearer is a bi-directional radio bearer (RB) and includes a logical channel DTCH (dedicated traffic channel), a transport channel DCH (dedicated channel) and a physical channel DPCH (dedicated physical channel) or a physical channel SCCPCH (secondary common control physical channel).

The point-to-multipoint radio bearer is a unidirectional downlink radio bearer (RB). And, the point-to-multipoint radio bearer, as shown in FIG. 3, includes a logical channel MTCH (MBMS traffic channel), a transport channel FACH (forward access channel) and a physical channel SCCPCH. The logical channel MTCH is configured for each MBMS offered to one cell and is used in transmitting user-plane data of a specific MBMS to a plurality of UEs.

A logical channel MCCH (MBMS control channel), as shown in FIG. 3, is a point-to-multipoint downlink channel and is used in transmitting control information associated with the MBMS. The logical channel MCCH is mapped to the transport channel FACH (forward access channel), while the transport channel FACH is mapped to the physical channel SCCPCH (secondary common control physical channel). And, one MCCH exists in one cell.

Configuration information of MCCH is transmitted via system information block (SIB) of BCCH. In case of MCCH reconfiguration, UE firstly receives BCCH modification information transmitted on FACH or PCH, receives SIB according to this information and then obtains MCCH reconfiguration information included in the received SIB.

The UTRAN offering the MBMS transmits MCCH information to a plurality of UEs via the MCCH channel. The MCCH information includes a notification message associated with the MBMS, i.e., an RRC message associated with the MBMS. For instance, the MCCH information includes a message that notifies MBMS information, a message that notifies point-to-multipoint radio bearer information, access information notifying that RRC connection is requested for specific MBMS and the like.

FIG. 4 is a diagram for explaining a transmission method of MCCH information.

Referring to FIG. 4, MCCH information is periodically transmitted according to a modification period and a repetition period. The MCCH information is divided into critical information and non-critical information. In the critical information and non-critical information, the non-critical information can be freely modified each modification period or each repetition period to be transmitted. Yet, the modification of the critical information can be made each modification period only to be transmitted. Namely, the critical information is repeated one time each repetition period to be transmitted. Yet, the transmission of the modified critical information is possible at a start point of the modification period only.

The MCCH information means a control message associated with MBMS, i.e., an RRC message associated with MBMS. A message of MBMS modified services information (hereinafter abbreviated 'MSI'), MBMS unmodified services information (hereinafter abbreviated 'USI'), MBMS point-to-multipoint RB information, access information or the like corresponds to the MCCH information. The access information message corresponds to the non-critical information and the rest of the MCCH information messages correspond to the critical information. In this case, the access information is transmitted once each access period equal to or smaller than the repetition period and a length of the repetition period corresponds to a multiplication of an access period length.

In transmitting theses messages, if the corresponding message carries information of a specific service, UTRAN transmits the corresponding message with MBMS transmission identity. In this case, the MBMS transmission identity includes MBMS session identity and MBMS identity. For instance, in case of transmitting MBMS modified services information message, the corresponding message is transmitted with the MBMS transmission identity and information of a service corresponding to the transmission identity.

UTRAN periodically transmits the physical channel MICH (MBMS notification indicator channel) shown in FIG. 3 to indicate whether MCCH information is updated during modification period. So, UE attempting to receive one specific MBMS only does not receive MCCH or MTCH prior to a beginning of a session of the corresponding service but periodically receives MICH (MBMS notification indicator channel). For reference, an update of MCCH information in this specification means creation, addition, modification or removal of a specific item of MCCH information.

And, UTRAN transmits MSI message together with MICH to indicate whether MCCH information is updated during a modification period. The MSI message carries identity information of all service(s) updated during corresponding modification period in a current cell and operation information requested to UE subscribed to the corresponding service. In this case, MBMS transmission identity is used as the identity information. And, the MBMS transmission identity is configured with MBMS identity indicating a specific service only. Alternatively, the MBMS transmission identity can be configured in a manner of combining MBMS session identity and MBMS identity together. Meanwhile, identity information of service(s) not modified during the modification period among services currently provided in a corresponding cell is carried by USI message. In this case, MBMS transmission identity of the corresponding service is used as identity information.

Once a session of a specific MBMS begins, UTRAN transmits NI (notification indicator), which is an indicator notifying UEs to receive MCCH, to the UEs attempting to receive the specific MBMS via MICH. The UE having received the NI via MICH receives the MCCH during a specific modification period. While receiving MCCH, the UE receives MSI message and then checks whether a specific MBMS to be received by the UE is modified during a corresponding modification period. If the specific MBMS is modified, the UE obtains modified MCCH information. Meanwhile, the UE can recognize a list of all services provided in a current cell during the corresponding modification period by receiving MSI and USI messages transmitted for one modification period.

UE, which attempts to receive a specific MBMS using a point-to-multipoint radio bearer, receives MCCH information including radio bearer information via MCCH and then establishes the point-to-multipoint radio bearer using the received information. Having established the point-to-multipoint radio bearer, the UE keeps receiving physical channel SCCPCH, to which MTCH is mapped, to acquire data of the specific MBMS transmitted via MTCH.

UTRAN can discontinuously transmit MBMS data on MTCH. In this case, the UTRAN, as shown in FIG. 5, periodically transmits a scheduling message to UE via MSCH (MBMS scheduling channel) of SCCPCH carrying MTCH. In this case, the scheduling message indicates a transmission start timing point and a transmission interval of MBMS data to be transmitted during one scheduling period. For this, UTRAN has to inform UE of a transmission period (scheduling period) of scheduling information in advance. An MSCH is mapped to SCCPCH carrying MTCH and can exist for each SCCPCH carrying MTCH at most. In this case, the MSCH carrying the scheduling information for the MTCH is MSCH mapped to the same SCCPCH of the MTCH.

Meanwhile, UE preferentially acquires a scheduling period from UTRAN, receives a scheduling message periodically according to the acquired scheduling period, and then receives SCCPCH carrying MTCH discontinuously and periodically using the received scheduling message. Namely, the UE receives the SCCPCH carrying the MTCH during a time interval for transmitting data but does not receive the SCCPCH carrying the MTCH during a time interval for not transmitting data, using the scheduling message.

In case that at least two neighbor cells transmit MBMS of the same information on MTCH, UE receives SCCPCH carrying the MTCH transmitted from the cells by soft combining or selection combining to raise reception sensitivity. In case of soft combining, transport blocks from the cells should be identical during the same time interval. To facilitate UE to perform soft combining, UTRAN transmits transport blocks for one transport channel only during one TTI. And, the UTRAN provides a point-to-multipoint radio bearer information message of the neighbor cells on MCCH as well as a point-to-multipoint radio bearer information message of a current cell to facilitate the UE to perform selection combining reception.

In order to facilitate UE to select cells for combining reception, UTRAN needs to inform UE of a transmission parameter of a transport or physical channel carrying MBMS transmitted by each cell. As an example of the transmission parameter, transmission power information of the transport or physical channel can be taken. Yet, the transmission parameter is not the information mandatory for the UE but is useful in case of the combining reception of a specific service. Hence, it is necessary to selectively transmit the transmission parameter to UEs in need of the transmission parameter.

DISCLOSURE OF THE INVENTION

Accordingly, the present invention is directed to a method of transmitting a point-to-multipoint service in a mobile communication system, method of receiving the same, apparatus for transmitting the same and apparatus receiving the same that substantially obviate one or more of the problems due to limitations and disadvantages of the related art.

An object of the present invention is to provide a method of informing a transmission parameter of a channel on which a point-to-multipoint service is provided by a plurality of cells to UEs receiving the point-to-multipoint service.

Another object of the present invention is to provide a method of transmitting and receiving a point-to-multipoint service in a mobile communication system, by which reception efficiency of the point-to-multipoint service can be enhanced by combining the point-to-multipoint service in UE.

Another object of the present invention is to provide a method of preventing UE from receiving unnecessary information by providing a transmission parameter of a channel carrying a point-to-multipoint service to other UEs in need of the transmission parameter only.

The present invention is characterized in transmitting a transmission parameter of a first channel providing a point-to-multipoint service to at least one UE via a second channel mapped to the first channel. As an example of the transmission parameter, a transmission power used in transmitting the point-to-multipoint service on the first channel can be taken. The transmission parameter can include information for transmission power used by at least one neighbor cell to transmit the point-to-multipoint service via the first channel as well as transmission power information of a cell at which the UE is currently located. Preferably, the transmission power information is an offset or ratio value between the transmission power of the first channel and transmission power of a reference channel such as a pilot channel transmitted from each of the cells.

The first channel is a lower layer channel of the second channel and a third channel which is located in a same layer with the second channel is mapped to the first channel so that traffic data for the point-to-multipoint service can be transmitted via the third channel. In this case, the discrimination between the upper and lower layers is not physical but logical. For instance, the first channel is a transport or physical channel and each of the second and third channels is a logical channel. Preferably, the second channel is a scheduling channel carrying scheduling information of the point-to-multipoint service. And, the transmission parameter can be transmitted by being included in a specific message transmitted on the scheduling channel. In case that the first channel is the physical channel, the physical channel is discriminated by a code in a CDMA system or by a time and frequency in an OFDM (orthogonal frequency division multiplexing) or OFDMA (orthogonal frequency division multiple access) system.

The UE, which is receiving the point-to-multipoint service via the third channel, receives the transmission parameter associated with the first channel transmitted from a plurality of cells via the second channel mapped to the first channel. The UE selects at least two of a plurality of the cells to receive the point-to-multipoint service based on the transmission parameter and then receives the point-to-multipoint service by combining the first channels transmitted from the selected at least two cells. For instance, in case of receiving transmission power information from a plurality of the cells as the transmission parameter, the UE selects at least two cells having best signal quality by comparing transmission powers of the cells and then combines the point-to-multipoint services received from the at least two cells.

As an example of the point-to-multipoint service, a point-to-multipoint multimedia service or a multimedia broadcast/multicast service (MBMS) can be taken.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of receiving a point-to-multipoint service on a point-to-multipoint channel in a mobile communication system according to the present invention includes the steps of receiving at least one transmission parameter on a point-to-multipoint signaling channel providing scheduling information of the point-to-multipoint service wherein the point-to-multipoint signaling channel is mapped to the point-to-multipoint channel, combining the point-to-multipoint channel transmitted from a plurality of cells by using the at least one transmission parameter, and receiving the point-to-multipoint service on a point-to-multipoint traffic channel, wherein the point-to-multipoint traffic channel is mapped to the point-to-multipoint channel.

To further achieve these and other advantages and in accordance with the purpose of the present invention, a method of receiving a point-to-multipoint service on a point-to-multipoint channel in a mobile communication system includes the steps of receiving at least one transmission parameter on a point-to-multipoint signaling channel providing scheduling information of the point-to-multipoint service, wherein the point-to-multipoint signaling channel is mapped to the point-to-multipoint channel, and receiving the point-to-multipoint service by combining point-to-multipoint channels transmitted from a plurality of cells based on the at least one transmission parameter wherein the point-to-multipoint channels provide the point-to-multipoint service.

To further achieve these and other advantages and in accordance with the purpose of the present invention, a method of receiving a point-to-multipoint service in a mobile communication system includes the steps of receiving a transmission parameter of a plurality of cells on a first channel providing scheduling information of the point-to-multipoint service, wherein the first channel is mapped to a second channel on which the point-to-multipoint service is transmitted, determining at least two cells among a plurality of the cells to receive the point-to-multipoint service based on the transmission parameter, and receiving the point-to-multipoint service by combining second channels transmitted from the at least two cells.

To further achieve these and other advantages and in accordance with the purpose of the present invention, a method of transmitting a point-to-multipoint service in a mobile communication system includes the steps of transmitting data for the point-to-multipoint service on a first channel mapped to a second channel to at least one mobile terminal, and transmitting at least one transmission parameter of a plurality of cells on a third channel providing scheduling information of the point-to-multipoint service to the at least one mobile terminal, wherein the third channel is mapped to the second channel.

To further achieve these and other advantages and in accordance with the purpose of the present invention, a receiver for receiving a point-to-multipoint service on a point-to-multipoint channel in a mobile communication system includes a means for receiving at least one transmission parameter on a point-to-multipoint signaling channel providing scheduling information of the point-to-multipoint service, wherein the point-to-multipoint signaling channel is mapped to the point-to-multipoint channel, and a means for receiving the point-to-multipoint service by combining point-to-multipoint channels transmitted from a plurality of cells based on the at least one transmission parameter, wherein the point-to-multipoint channels provide the point-to-multipoint service.

To further achieve these and other advantages and in accordance with the purpose of the present invention, a receiver for receiving a point-to-multipoint service in a mobile communication system includes a means for receiving a transmission parameter of a plurality of cells on a first channel providing scheduling information of the point-to-multipoint service, wherein the first channel is mapped to a second channel on which the point-to-multipoint service is transmitted, a means for determining at least two cells among a plurality of the cells to receive the point-to-multipoint service based on the transmission parameter, and a means for receiving the point-to-multipoint service by combining second channels transmitted from the at least two cells.

To further achieve these and other advantages and in accordance with the purpose of the present invention, a transmitter for transmitting a point-to-multipoint service in a mobile communication system includes a means for transmitting data for the point-to-multipoint service on a first channel mapped to a second channel to at least one mobile terminal, and a means for transmitting at least one transmission parameter of a plurality of cells on a third channel providing scheduling information of the point-to-multipoint service to the at least one mobile terminal, wherein the third channel is mapped to the second channel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
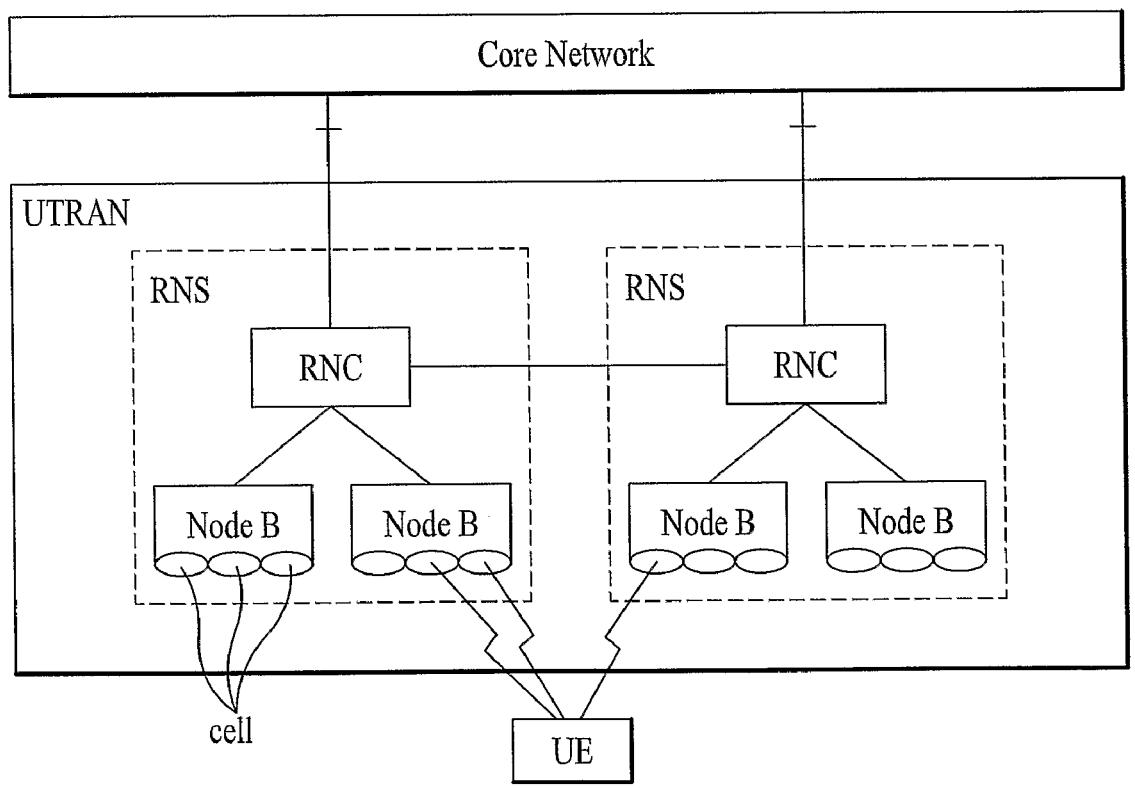
FIG. 1 is a block diagram of a network structure of UMTS (universal mobile telecommunications system) of 3GPP asynchronous IMT-2000 system.
Figure 2:
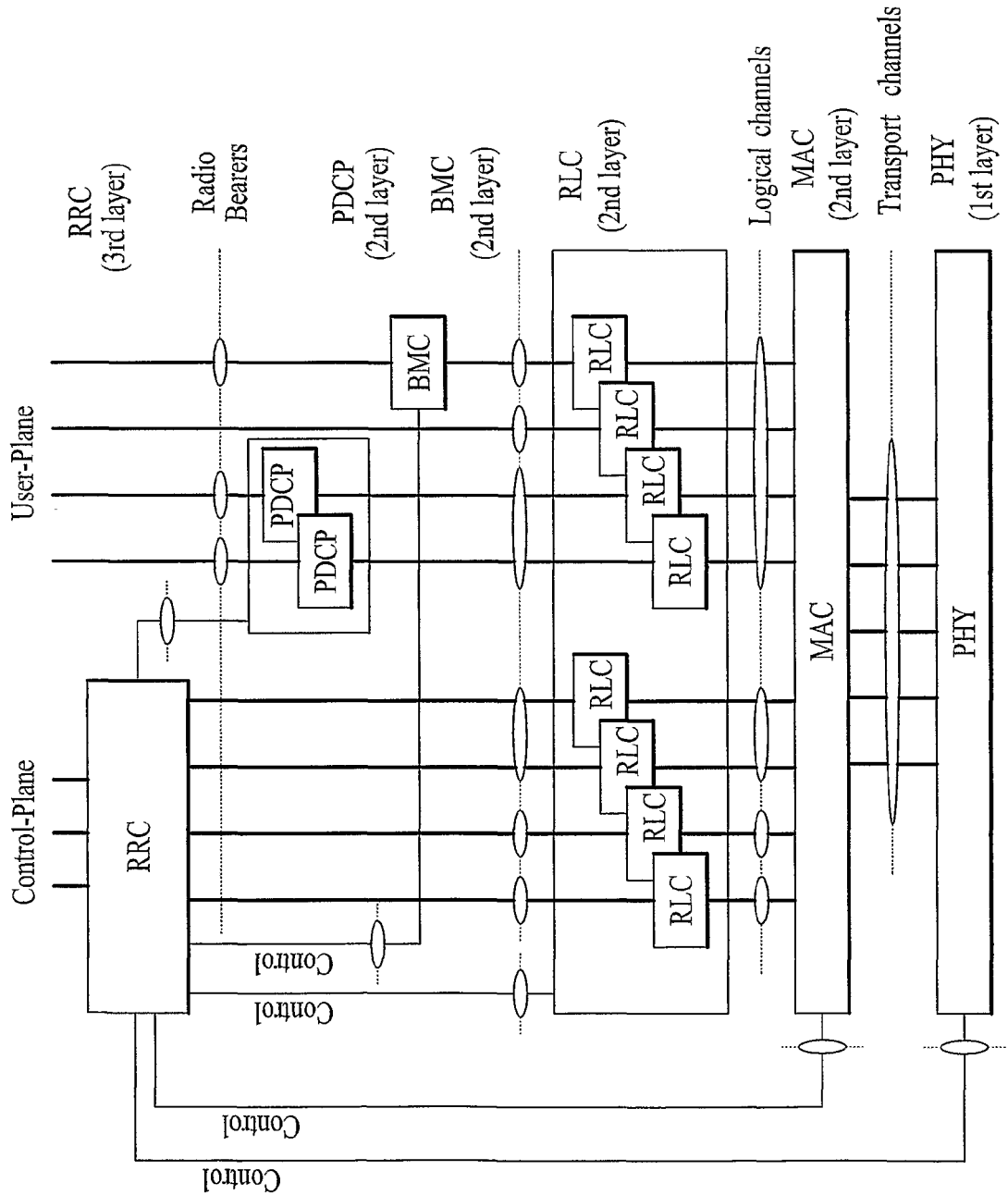
FIG. 2 is an architectural diagram of a radio interface protocol used in UMTS.
Figure 3:
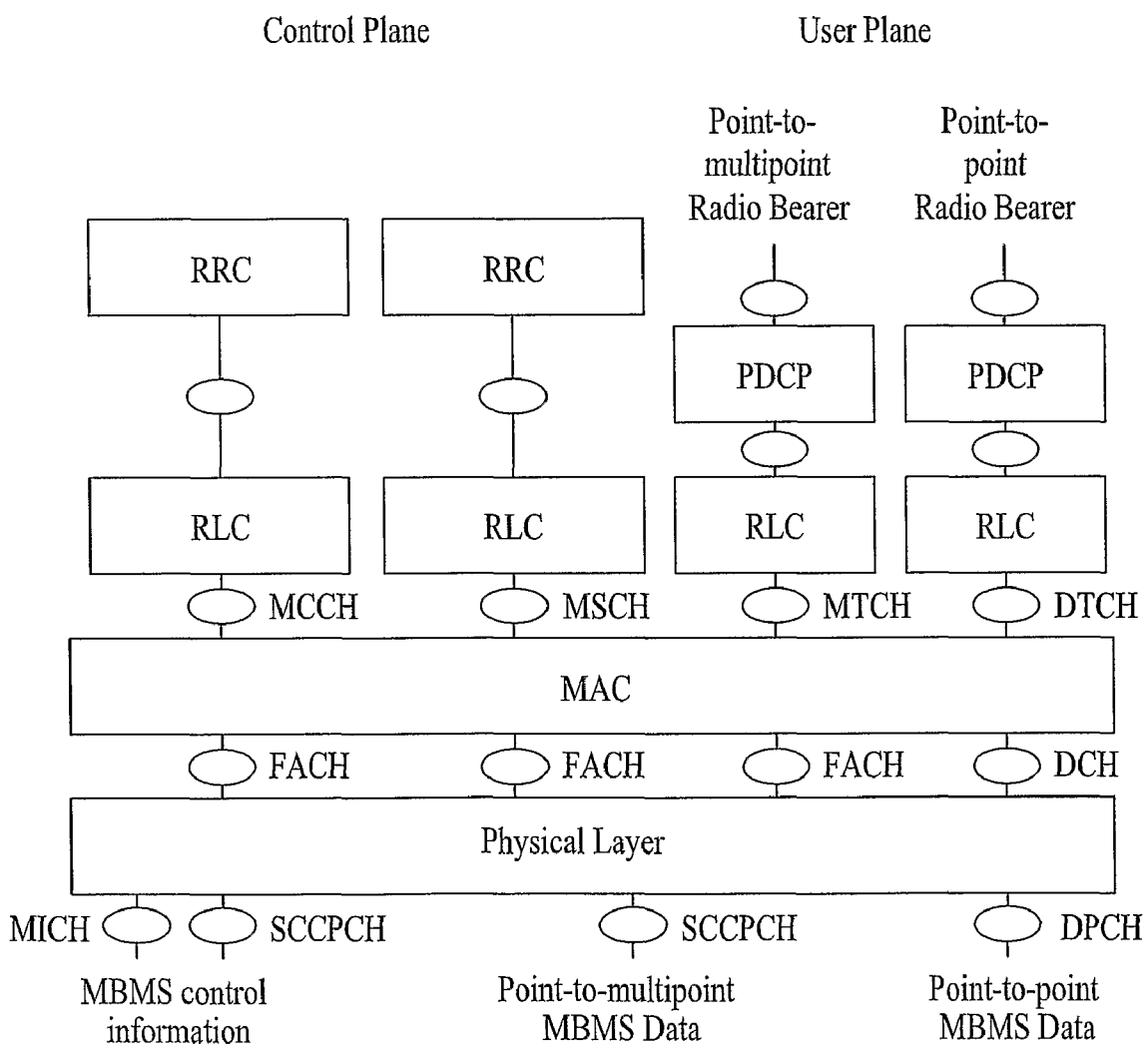
FIG. 3 is a diagram of a channel configuration for MBMS in UE according to a related art.
Figure 4:
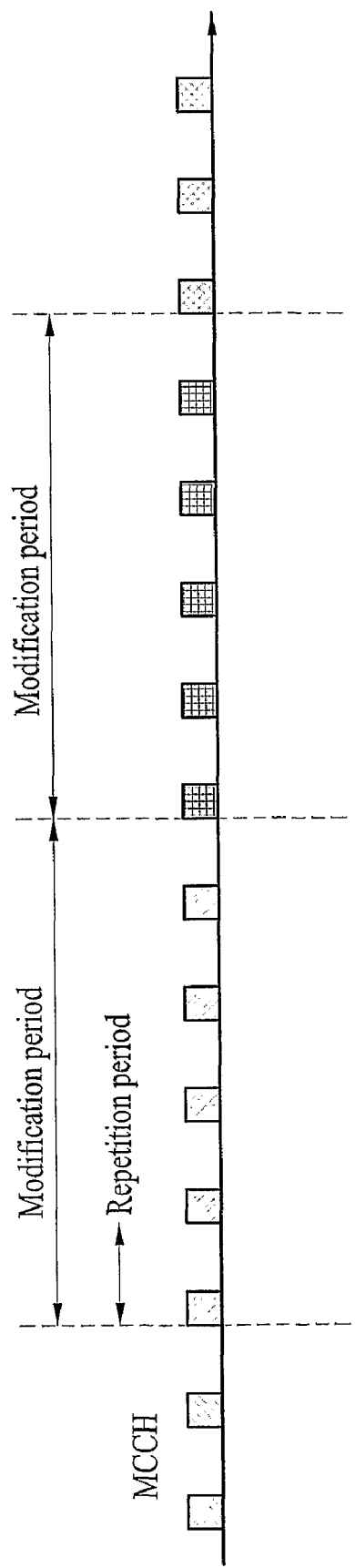
FIG. 4 is a diagram for explaining an MCCH information transmitting method according to a related art.
Figure 5:
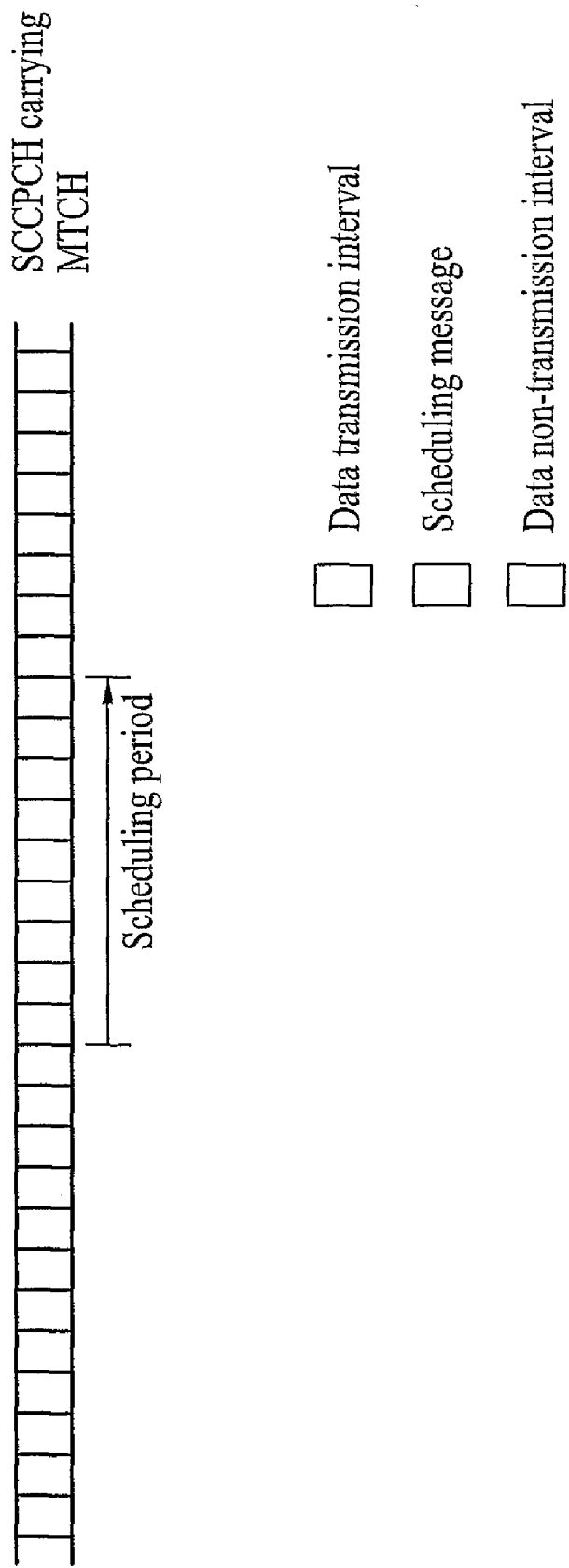
FIG. 5 is a diagram for explaining that UTRAN is able to transmit MBMS data discontinuously via MTCH.
Figure 6:
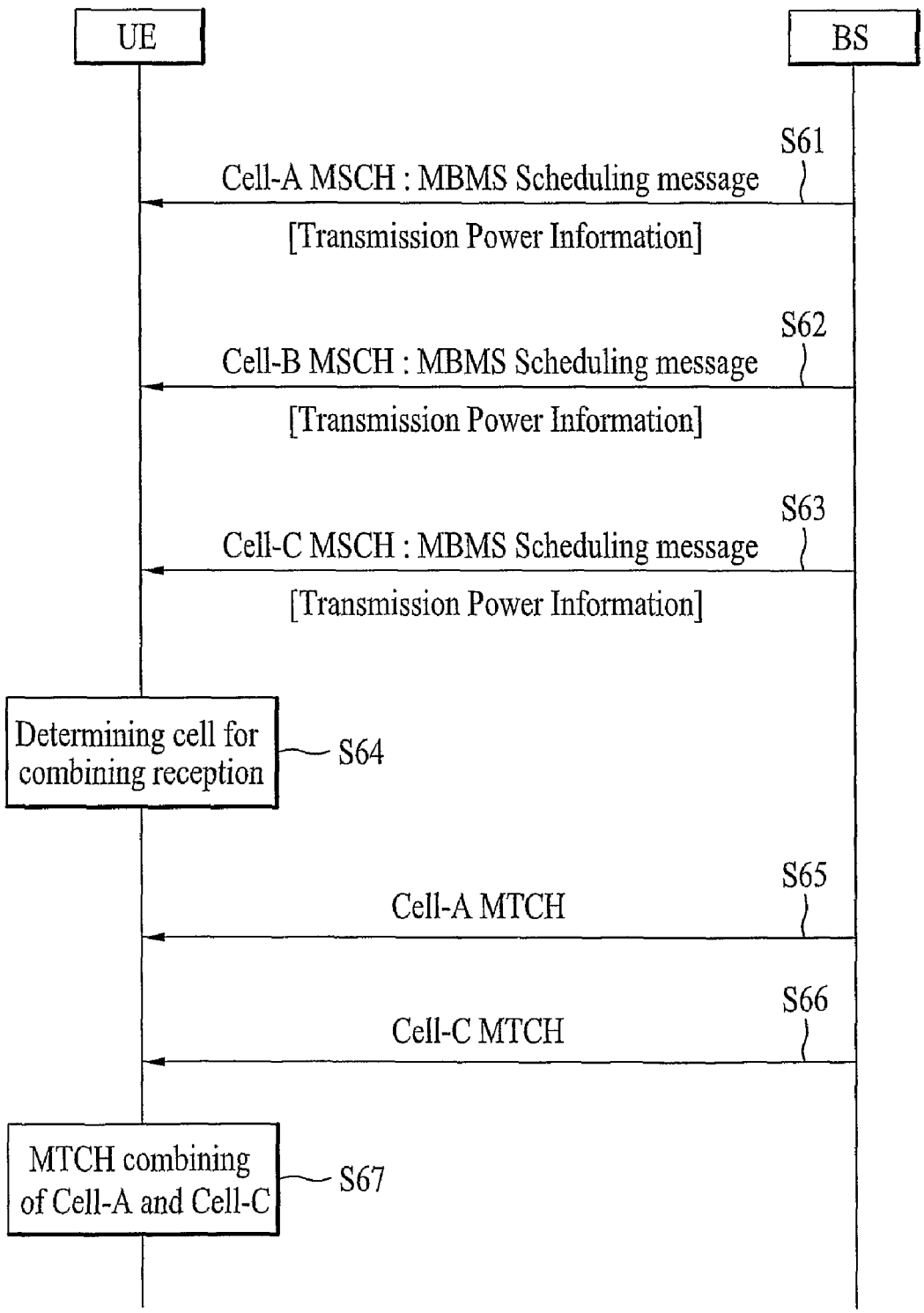
FIG. 6 is a flowchart of one preferred embodiment of the present invention.

FIG. 6 is a flowchart of one preferred embodiment of the present invention.

Referring to FIG. 6, UTRAN transmits transmission power information by including it in an MBMS scheduling message periodically transmitted on an MSCH of each cell (cell-A, cell-B and cell-C in FIG. 6). In this case, it is unnecessary to include the transmission power information in each of the MBMS scheduling messages. In case that the transmission power information needs to be transmitted to UE, the transmission power information is selectively included in the MBMS scheduling message. Moreover, each of the cells is able to transmit its transmission power information on the MSCH. Yet, it is also possible for each of the cells to transmit its transmission power information together with transmission power information of at least one neighbor cell.

The UE receives the transmission power information included in the MBMS scheduling message received via the MSCH. FIG. 6 shows an example of receiving the MSCH from each cell (S61, S62, S63). For another example, if transmission power information of neighbor cells is included in the MBMS scheduling message received via MSCH from a cell at which the UE is currently located, the UE can acquire the transmission power information of a plurality of cells from the MBMS scheduling message transmitted from the cell at which the UE is located without receiving MBMS scheduling messages from a plurality of the cells.

The UE selects cells for combining reception for a specific service using the transmission power information received via the MSCH (S64). In FIG. 6, the cell-A and the cell-C are selected for example. For instance, if the transmission power information indicates a power difference (Tx power offset) between CPICH (Common Pilot Channel) transmission power of each cell and transmission power of a physical channel SCCPCH carrying each data channel, the UE can select at least two cells having the value considerably great.

Figure 7:
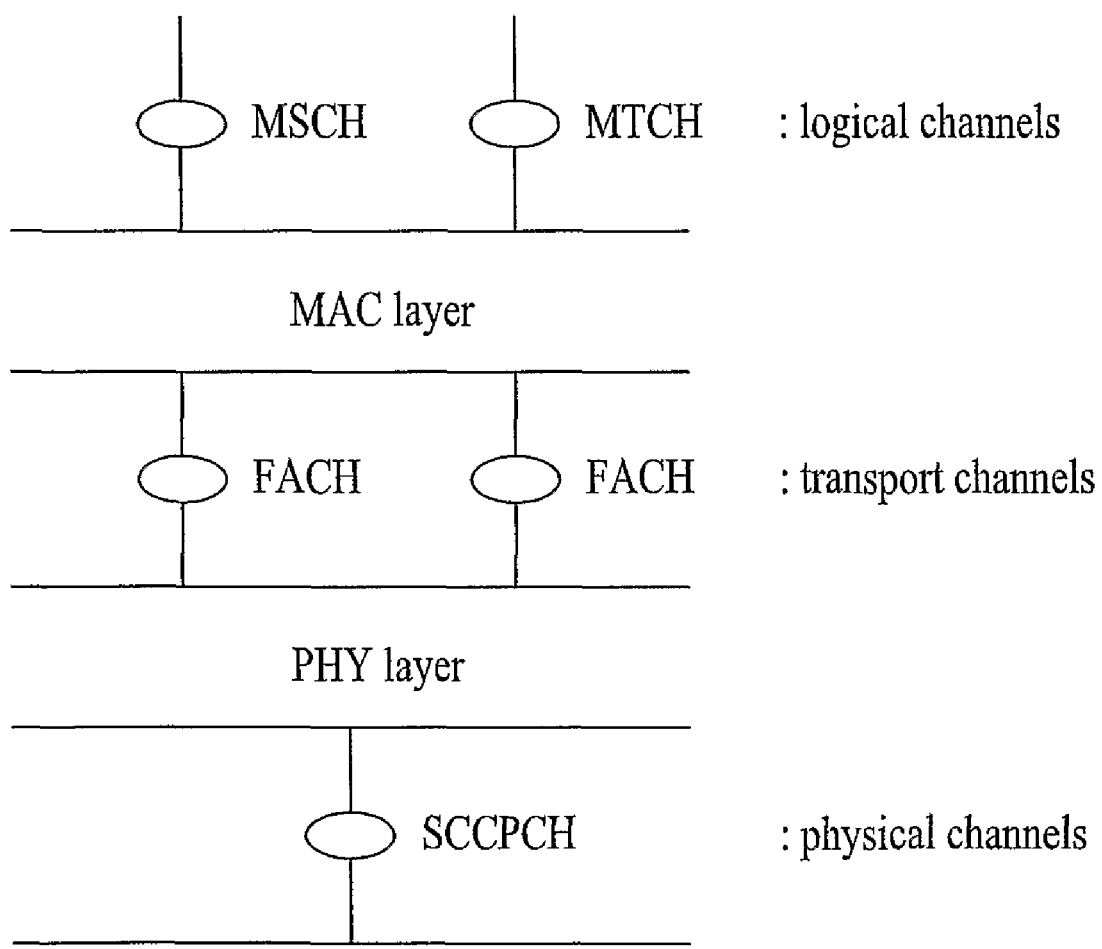
FIG. 7 is a flowchart for explaining a detailed operation of UE according to one preferred embodiment of the present invention

FIG. 7 is a diagram for explaining a detailed operation of UE according to one preferred embodiment of the present invention.

Referring to FIG. 7, UE receives the MSCH mapped to a same physical channel as the MTCH while receiving the MTCH carrying MBMS data. The MSCH and the MTCH are logical channels and are mapped to a physical channel SCCPCH via a transport channel FACH (forward access channel). The MSCH and MTCH may be directly mapped to the SCCPCH by omitting the FACH in another protocol architecture used in other mobile communication system.

Subsequently, the UE receives the MTCH for the service via cell-A and cell-B selected from the cells (S65, S66). The UE receives data for the MBMS by combining MTCHs of the cell-A and the cell-B together (S67). For the combining method, soft combining or selective combining can be employed.

Figure 8:
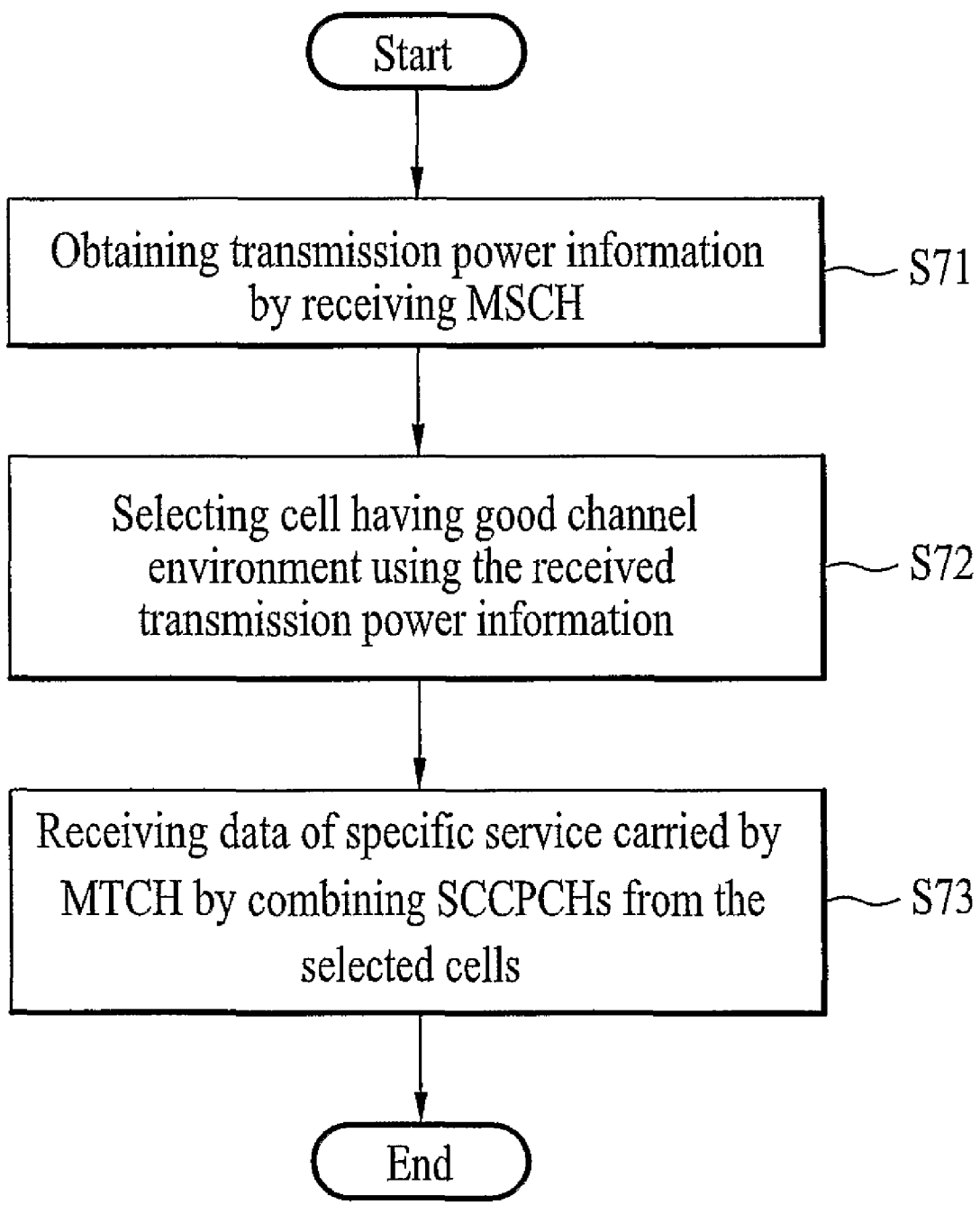
FIG. 8 is a block diagram of a wireless communication apparatus such as a mobile terminal performing functions of the present invention.

FIG. 8 is a flow chart in accordance with another preferred embodiment of the present invention.

Referring to FIG. 8, UE, which receives a specific MBMS, receives an MBMS scheduling message via an MSCH carrying scheduling information of the MBMS from one or a plurality of cells and then obtains transmission power information included in the received message (S71). The UE selects at least two cells having good channel environments or MTCHs of the at least two cells using the received transmission power information (S72). The UE obtains data of the specific MBMS by receiving MTCHs of the selected cells or the selected MTCHs by soft combining or selective combining (S73).

The scheduling message in FIG. 6 or FIG. 8 can follow one format of Table 1 to Table 3 explained in the following description. Table 1 to Table 3 show examples of data formats of MBMS scheduling message used in RRC layer according to the present invention.

UTRAN can periodically transmit transmission power information of a physical channel SCCPCH carrying an MTCH via an MSCH. In this case, the transmission power information can be transmitted by being included in an MBMS scheduling message of the MSCH mapped to the physical channel SCCPCH carrying the MTCH as shown in Table 1 to Table 3. Preferably, the transmission power information is a power difference (Tx Power Offset) between CPICH transmission power of each cell transmitting a corresponding data channel and transmission power of the physical channel SCCPCH carrying each data channel. In Table 1 to Table 3, information elements for transmission power information according to one embodiment of the present invention are represented as italic styles.

Table 1 shows that for each service transmitted through a SCCPCH carrying an MSCH, transmission power information for the SCCPCH of a current cell (i.e., specific cell) for each service is transmitted via the MSCH transmitted from one specific cell together with transmission power information for SCCPCHs of neighbor cells. A message in Table 1 is an example of transmitting SCCPCH transmission power offset (Tx power offset) of a current cell and SCCPCH transmission power offset (Tx power offset) of neighbor cells for each service.

TABLE 1

| Information element/Group name | Need | Multi | Type and reference | Semantics description |
|---|---|---|---|---|
| Message type | MP | | Message type | |
| Service scheduling info list | MP | 1 to <maxMBMSservSched> | | |
| >MBMS Transmission identity | MP | | MBMS Transmission identity 10.3.9a.12 | |
| >MBMS service transmission info list | OP | 1 to <maxMBMSTransmis> | | One or more sets of scheduling information comprising of the beginning and duration of an MBMS transmission for one scheduling period |
| >>Start | MP | | Integer (0 . . . 1020) by step of 4 | Indicates the start of the transmission relative to the TTI in which the MBMS SCHEDULING INFORMATION message was received. In number of radio frames. |
| >>Duration | MP | | Integer (4 . . . 1024) | In number of radio frames. |
| >S-SSPCH Tx power offset | OP | | | |
| >>Current cell's S-SSPCH Tx power offset | MP | | Integer (. . .) | Indicates the power level of secondary CCPCH relative to the power of the Primary CPICH in FDD or Primary CCPCH Tx power in TDD for the current cell where this SCCPCH is transmitted. |

TABLE 1-continued

| Information element/Group name | Need | Multi | Type and reference | Semantics description |
|---|---|---|---|---|
| >>Neighboring cell'sS-CCPCH list | MP | 1 to <maxSCCPCH> | | |
| >>Neighboring cell'sS-SSPCH Tx power offset | MP | | Integer (...) | Indicates the power level of secondary CCPCH relative to the power of the Primary CPICH in FDD or Primary CCPCH Tx power in TDD for a neighboring cell. |
| >Next scheduling period | MP | | Integer (0...31) | Number of scheduling periods, after the current scheduling period, in which no data will be transmitted for the concerned service. If the Next scheduling period is set to 0, data may be transmitted for the concerned service in the scheduling period immediately following the current scheduling period. |

Table 2 shows a case that an MSCH transmitted from one specific cell transmits transmission power information for a SCCPCH of a current cell (i.e., specific cell) and transmission power information of neighbor cells. A message of Table 2 includes a transmission power offset (Tx power offset) of the SCCPCH, to which the MSCH transmitting the message is mapped, of a current cell and a transmission power offset (Tx power offset) of SCCPCHs of neighbor cells.

TABLE 2

| Information element/Group name | Need | Multi | Type and reference | Semantics description |
|---|---|---|---|---|
| Message type | MP | | Message type | |
| S-SSPCH Tx power offset | OP | | | |
| >>Current cell's S-SSPCH Tx power offset | MP | | Integer (...) | Indicates the power level of secondary CCPCH relative to the power of the Primary CPICH in FDD or Primary CCPCH Tx power in TDD for the current cell where this SCCPCH is transmitted. |
| >>Neighboring cell'sS-CCPCH list | MP | 1 to <maxSC CPCH> | | |
| >>Neighboring cell'sS-SSPCH Tx power offset | MP | | Integer (...) | Indicates the power level of secondary CCPCH relative to the power of the Primary CPICH in FDD or Primary CCPCH Tx power in TDD for a neighboring cell. |
| Service scheduling info list | MP | 1 to <maxMBMsservSched> | | |
| >MBMS Transmission identity | MP | | MBMS Transmission identity 10.3.9a.12 | |
| >MBMS service transmission info list | OP | 1 to <maxMBMSTransmis> | | One or more sets of scheduling information comprising of the beginning and duration of an MBMS transmission for one scheduling period |
| >>Start | MP | | Integer (0...1020) by step of 4 | Indicates the start of the transmission relative to the TTI in which the MBMS SCHEDULING INFORMATION message was received. In number |

TABLE 2-continued

| Information element/Group name | Need | Multi | Type and reference | Semantics description |
|---|---|---|---|---|
| >>Duration | MP | | Integer (4 ... 1024) | of radio frames. In number of radio frames. |
| >Next scheduling period | MP | | Integer (0 ... 31) | Number of scheduling periods, after the current scheduling period, in which no data will be transmitted for the concerned service. If the Next scheduling period is set to 0, data may be transmitted for the concerned service in the scheduling period immediately following the current scheduling period. |

Table 3 shows a case that an MSCH transmitted from one specific cell transmits transmission power information for a SCCPCH of a current cell i.e., specific cell). A message of Table 3 includes a transmission power offset (Tx power offset) of the SCCPCH, which carries the MSCH transmitting the message, of a current cell.

TABLE 3

| Information element/Group name | Need | Multi | Type and reference | Semantics description |
|---|---|---|---|---|
| Message type | MP | | Message type | |
| S-SSPCH Tx power offset | MP | | Integer (...) | Indicates the power level of Secondary CCPCH relative to the power of the Primary CPICH in FDD or Primary CCPCH Tx Power in TDD for the current cell where this SCCPCH is transmitted. |
| Service scheduling info list | MP | 1 to <maxMBMsservSched> | | |
| >MBMS Transmission identity | MP | | MBMS Transmission identity 10.3.9a.12 | |
| >MBMS service transmission info list | OP | 1 to <maxMBMSTransmis> | | One or more sets of scheduling information comprising of the beginning and duration of an MBMS transmission for one scheduling period |
| >>Start | MP | | Integer (0 ... 1020) by step of 4 | Indicates the start of the transmission relative to the TTI in which the MBMS SCHEDULING INFORMATION message was received. In number of radio frames. |
| >>Duration | MP | | Integer (4 ... 1024) | In number of radio frames. |
| >Next scheduling period | MP | | Integer (0 ... 31) | Number of scheduling periods, after the current scheduling period, in which no data will be transmitted for the concerned service. If the Next scheduling period is set to 0, data may be transmitted for the concerned service in the scheduling period immediately following the current scheduling period. |

Table 4 shows an example of MSCH configuration information format of an RRC layer according to one embodiment of the present invention. In Table 4, UTRAN can include 'SCCPCH Tx power offset presence' field in the MSCH configuration information to indicate whether an MSCH is going to transmit SCCPCH transmission D power offset (Tx power offset) additionally. In this case, UE performs the processes of FIG. 6 and FIG. 8 in case of recognizing that the SCCPCH transmission power offset (tx power offset) is transmitted via the MSCH by the 'SCCPCH Tx power offset presence' in configuring the MSCH.

TABLE 4

| Information element/Group name | Need | Multi | Type and reference | Semantics description | Version |
|---|---|---|---|---|---|
| MSCH configuration information | MP | | Message type | Scheduling information is provided starting at SFN mod MSCH_REP = MSCH_OFF | REL-6 |
| >Scheduling period | MD | | Enumerated (32, 64, 128, 256, 512, 1024) | The period, in number of frames, between MBMS scheduling messages (MSCH_REP) Default value is the value included in the MBMS GENERAL INFORMATION message. | REL-6 |
| >Scheduling offset | MD | | Integer (0 ... (MSCH_REP-1)) | The position of MBMS scheduling messages relative to timing of the corresponding cell (MSCH_OFF) Default value is the value included in the MBMS GENERAL INFORMATION message. | REL-6 |
| >RLC info | MD | | RLC info 10.3.4.23 | Default value is the one included in the MBMS GENERAL INFORMATION message. | REL-6 |
| TCTF presence | OP | | Enumerated (false) | By default of the TCTF is present even though the FACH only carries one logical channel (type). When this IE is included, the TCTF is absent. | REL-6 |
| *SCCPCH Tx power offset presence* | MP | | Boolean | TRUE indicates that the MBMS Scheduling Information message on this MSCH can provide SCCPCH Tx power. | REL-6 |

The present invention describes a mobile communication system and is also applicable to a wireless communication system for a PDA or notebook computer provided with a wireless communication function. Terminologies described in the present invention are not limited to a range of a wireless communication system. And, the present invention is applicable to a wireless communication system using different wireless interfaces and physical layers such as TDMA, CDMA, FDAM, etc.

Contents of the present invention can be implemented with software, firmware, hardware or combination of them. In particular, the contents of the present invention are implemented using hardware logic such as code, circuit chip and ASIC in hardware or by codes in a computer-readable storage medium such as a hard disc, a floppy disc and a tape, an optical storage, a ROM and a RAM using a computer programming language.

Codes stored in the computer-readable medium are accessible and executable by a processor. The codes implementing the contents of the present invention are accessible via a transmission medium or a file server on network. In this case, a code-implementing device includes a wire transmission medium such as a network transmission line, a wireless transmission medium, signaling, wireless signaling, IR signaling and the like.

Figure 9:
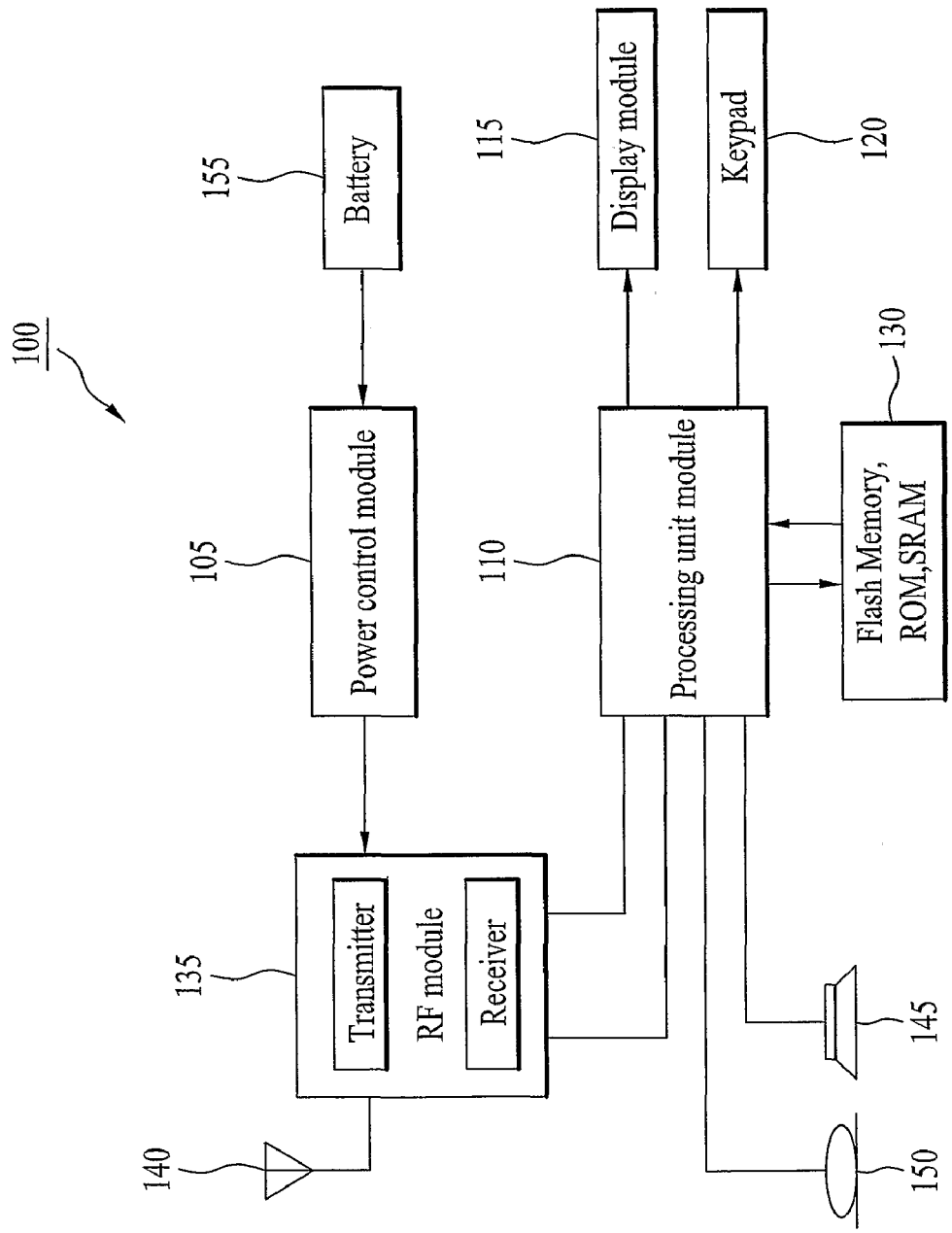
FIG. 9 is a block diagram of a wireless communication apparatus such as a mobile terminal that performs functions of the present invention.

FIG. 9 is a block diagram of a wireless communication apparatus 100 such as a mobile terminal that performs functions of the present invention.

Referring to FIG. 9, a wireless communication apparatus 100 includes a processing unit module 110 such as a microprocessor and a digital processor, an RF module 135, a power control module 106, an antenna 140, a battery 155, a display module 115, a keypad 120, a storage module 130 such as a ROM, an SRAM, and a flash memory, a speaker 145 and a microphone 150.

A user inputs command information such as a phone number by pressing a button or activates voice using the microphone 145.

The processing unit module 110 receives and processes the command information to perform a function requested by the user. The processing unit module 110 searches the storage module 130 for data necessary for performing the function and then uses the data. And, the processing unit module 110 enables the user's command information and the data searched from the storage module 130 to be displayed on the display module 115 for user's convenience.

The processing unit module 110 delivers information to the RF module 135 to transmit a radio signal including voice communication data.

The RF module 135 includes a transmitter and a receiver to transmit and receive the radio signal, respectively. The radio signal is finally transmitted or received via the antenna 140. Once receiving the radio signal, the RF module 135 converts the radio signal to a baseband frequency to enable the processing unit module 110 to process the radio signal. The converted signal is delivered via the speaker 145 or as readable information.

The RF module 135 is used in receiving data from a network or transmitting information measured or generated by the wireless communication apparatus to the network.

The storage module 130 is used in storing the measured or generated by the wireless communication apparatus.

And, the processing unit module 110 is appropriately used for the wireless communication apparatus to receive data, process the received data and transmit the processed data.

In the above-explained embodiments of the present invention, the technical features of the present invention are applied to the CDMA mobile communication system in which a physical channel is identified by a code. The technical features of the present invention is applicable to an OFDM or OFDMA mobile communication system in which a physical channel can be identified by a time and frequency and is further applicable to any kind of wireless communication systems having upper and lower channel structures.

INDUSTRIAL APPLICABILITY

Accordingly, the present invention is applicable to such a wireless communication system as wireless Internet, mobile communication system and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of receiving a point-to-multipoint service at a mobile terminal in a mobile communication system, the method comprising:

configuring a first channel providing scheduling information of the point-to-multipoint service by using configuring information received from a higher layer, wherein the configuring information includes a transmission power offset presence field indicating whether transmission power offset parameters are transmitted via the first channel;

receiving, from a current cell, the transmission power offset parameters corresponding to each of a plurality of cells including the current cell via the first channel, only if the transmission power offset presence field indicates that the transmission power offset parameters are transmitted via the first channel;

determining at least two cells among the plurality of cells based on the received transmission power offset parameters; and receiving the point-to-multipoint service by combining second channels transmitted from the determined at least two cells, wherein the second channels provide the point-to-multipoint service.

2. The method of claim 1, wherein each of the transmission power offset parameters is an offset value between a transmission power of one of the second channels corresponding to one of the plurality of cells and a transmission power of a reference channel.

3. A receiver for receiving a point-to-multipoint service in a mobile communication system, the receiver comprising:

a processing unit module for configuring a first channel providing scheduling information of the point-to-multipoint service by using configuring information received from a higher layer, wherein the configuring information includes a transmission power offset presence field indicating whether transmission power offset parameters are transmitted via the first channel; and a Radio Frequency (RF) module for receiving, from a current cell, the transmission power offset parameters corresponding to each of a plurality of cells including the current cell via the first channel, only if the transmission power offset presence field indicates that the transmission power offset parameters are transmitted via the first channel;
wherein the processing unit module is further for determining at least two cells among the plurality of cells based on the received transmission power offset parameters,
wherein the RF module is further for receiving the point-to-multipoint service by combining second channels transmitted from the determined at least two cells, and
wherein the second channels provide the point-to-multipoint service.

* * * * *